(12) United States Patent
Cummings et al.

(10) Patent No.: US 6,926,229 B2
(45) Date of Patent: Aug. 9, 2005

(54) AIRCRAFT WITH THRUST VECTORING FOR SWITCHABLY PROVIDING UPPER SURFACE BLOWING

(75) Inventors: Darold B. Cummings, Hawthorne, CA (US); Aaron J. Kutzmann, Long Beach, CA (US); Christopher K. Droney, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/730,357

(22) Filed: Dec. 8, 2003

(65) Prior Publication Data

US 2005/0133664 A1 Jun. 23, 2005

(51) Int. Cl.[7] ............................................. B04C 23/00
(52) U.S. Cl. .................. 244/12.5; 244/23 D
(58) Field of Search ............................. 244/12.1–12.6, 244/56, 66, 207, 55, 23 R, 23 D

(56) References Cited

U.S. PATENT DOCUMENTS

| | | | |
|---|---|---|---|
| 1,795,035 A | * | 3/1931 | Pellissier ..................... 244/56 |
| 3,051,413 A | * | 8/1962 | Pouit ........................ 244/12.5 |
| 3,756,542 A | * | 9/1973 | Bertin ........................ 244/216 |
| 3,938,760 A | * | 2/1976 | Hoppner et al. ........... 244/12.5 |
| 4,019,696 A | | 4/1977 | Hirt et al. |
| 4,030,687 A | | 6/1977 | Hapke |
| 4,392,621 A | | 7/1983 | Viets |
| 4,398,683 A | * | 8/1983 | Schmetzer ................. 244/12.5 |
| 4,478,378 A | * | 10/1984 | Capuani ..................... 244/12.4 |
| 4,482,108 A | | 11/1984 | Sutton |
| 4,969,614 A | * | 11/1990 | Capuani ..................... 244/12.4 |
| 5,098,034 A | * | 3/1992 | Lendriet ..................... 244/39 |
| 5,758,844 A | | 6/1998 | Cummings |
| 6,543,718 B2 | | 4/2003 | Provost |

* cited by examiner

*Primary Examiner*—Galen Barefoot
(74) *Attorney, Agent, or Firm*—Harness Dickey & Pierce P.L.C.

(57) ABSTRACT

Aircraft having thrust vectoring for switchably providing upper surface blowing. The aircraft generally includes a wing and an engine. The engine can be rotatably supported to supporting structure to allow the engine to be controllably rotated relative to the wing, and/or the engine can include a thrust vectoring nozzle. The engine's thrust vectoring capabilities allow the exhaust flow to be controllably vectored to switch on or off upper surface blowing depending on the aircraft's phase of operation. During a first phase, the exhaust flow can be vectored to flow across the upper wing surface to provide upper surface blowing to augment lift. During a second phase, the exhaust flow can be discharged generally downstream or rearwardly. The engine is positioned relative to the wing such that the exhaust flow does not provide upper surface blowing during the second phase.

26 Claims, 5 Drawing Sheets

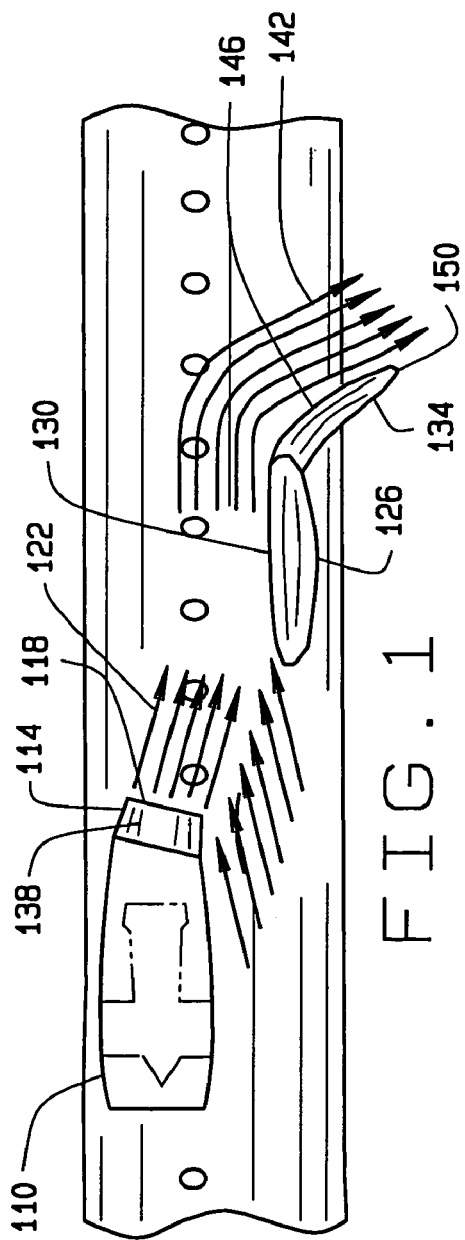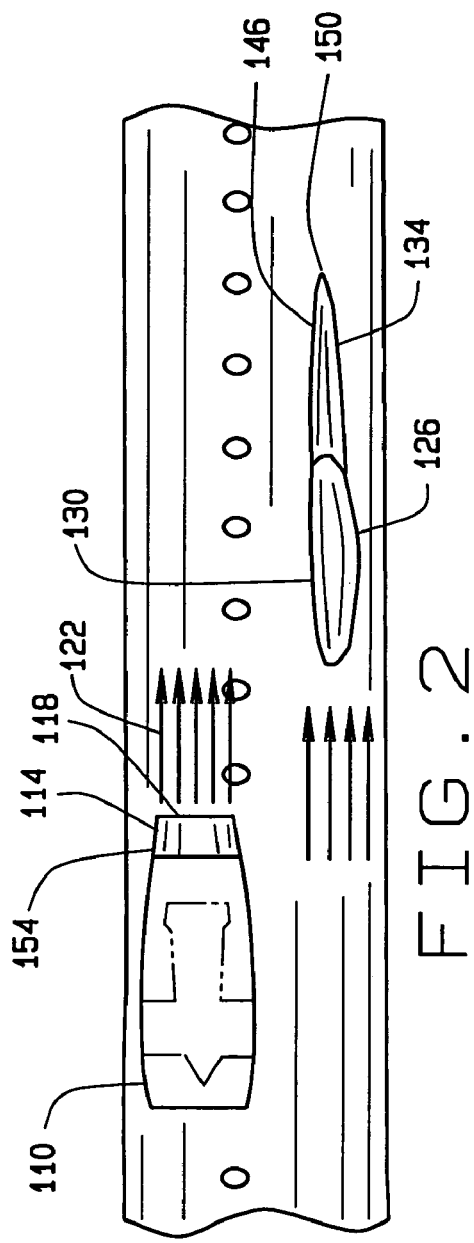

AIRCRAFT WITH THRUST VECTORING FOR SWITCHABLY PROVIDING UPPER SURFACE BLOWING

FIELD OF THE INVENTION

The present invention generally relates to aircraft which utilize upper surface blowing to augment wing lift, and more particularly to aircraft having thrust vectoring for switchably providing upper surface blowing which can be switched on or off.

BACKGROUND OF THE INVENTION

Many central hub airports for commercial airline carriers suffer from high traffic and runway congestion. There has been an increasing interest in short takeoff and landing (STOL) aircraft as a possible means for alleviating airport congestion. Because STOL aircraft can take advantage of the alternate shorter runways that generally coexist alongside longer counterpart runways, STOL aircraft can help combat airport congestion. Not only will STOL aircraft allow for an increased number of flights from congested airports, they will also increase the number of accessible airports.

Although existing STOL aircraft have worked well for its intended purposes including allowing shorter field operations, STOL is usually associated with an increased operational cost to the aircraft operator. For example, while upper surface blowing (USB) is an effective technique used to generate the lift required for STOL operations, USB has a tendency to decrease profitability due to a decreased propulsive efficiency caused by the required engine installations.

SUMMARY OF THE INVENTION

In a preferred implementation, a method of operating a jet engine on a mobile platform having at least one lift-producing surface generally includes using the engine to generate an exhaust flow, and controllably moving at least a nozzle of the engine into a corresponding one of a plurality of configurations including at least a first and a second configuration. In the first configuration, the exhaust flow is directed to flow across an upper surface of the lift-producing surface to provide upper surface blowing, which can augment lift. In the second configuration, the exhaust flow is discharged to flow generally downstream. The engine is positioned relative to the lift-producing surface such that the exhaust flow does not provide surface blowing when the second configuration is used. Accordingly, the thrust vectoring allows upper surface blowing to be switched on or off depending on the particular operating phase of the mobile platform.

In another preferred implementation, a method of operating a jet engine on a mobile platform having at least one airfoil generally includes using the engine to generate an exhaust flow, and controllably vectoring the exhaust flow depending on a phase of operation of the mobile platform. During a first phase, the exhaust flow can be vectored to flow across a surface of the airfoil to provide surface blowing to augment aerodynamic force generated by the airfoil. During a second phase, the exhaust flow can be vectored to flow generally downstream. The engine is positioned relative to the airfoil such that the exhaust flow does not provide surface blowing when the exhaust flow is vectored to flow generally downstream.

In another preferred embodiment, an aircraft generally includes a wing and a jet engine having a thrust vectoring nozzle. The nozzle is controllably movable into a corresponding one of a plurality of configurations including at least a first and a second configuration. In the first configuration, the nozzle is positioned to direct an exhaust flow across the upper wing surface to provide upper surface blowing. In the second configuration, the nozzle is positioned to discharge the exhaust flow generally downstream. The engine is positioned relative to the wing such that the exhaust flow does not provide upper surface blowing when the nozzle is in the second configuration.

In another preferred embodiment, an aircraft generally includes a wing and a jet engine rotatably supported to supporting structure of the aircraft. The engine is controllably rotatable relative to the wing into a corresponding one of a plurality of configurations including at least a first and a second configuration. In the first configuration, the engine is rotated to discharge the exhaust flow across the upper wing surface to provide upper surface blowing. In a second configuration, the engine is rotated to discharge the exhaust flow generally downstream. The engine is positioned relative to the wing such that the exhaust flow does not provide upper surface blowing when the engine is in the second configuration.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein:

FIG. 1 is a schematic view of a jet engine having a thrust vectoring nozzle shown in a preferred high-lift configuration in which the nozzle is vectored to direct exhaust flow across an upper surface of an airfoil and its deployed trailing edge flap to provide upper surface blowing according to a preferred embodiment of the invention;

FIG. 2 is a schematic view of the jet engine of FIG. 1 in a preferred cruise configuration in which the nozzle is faired to discharge the exhaust flow generally downstream without upper surface blowing across the airfoil or stowed trailing edge flap;

DETAILED DESCRIPTION OF THE PREFERRED EMBODIMENTS

Figure 3:
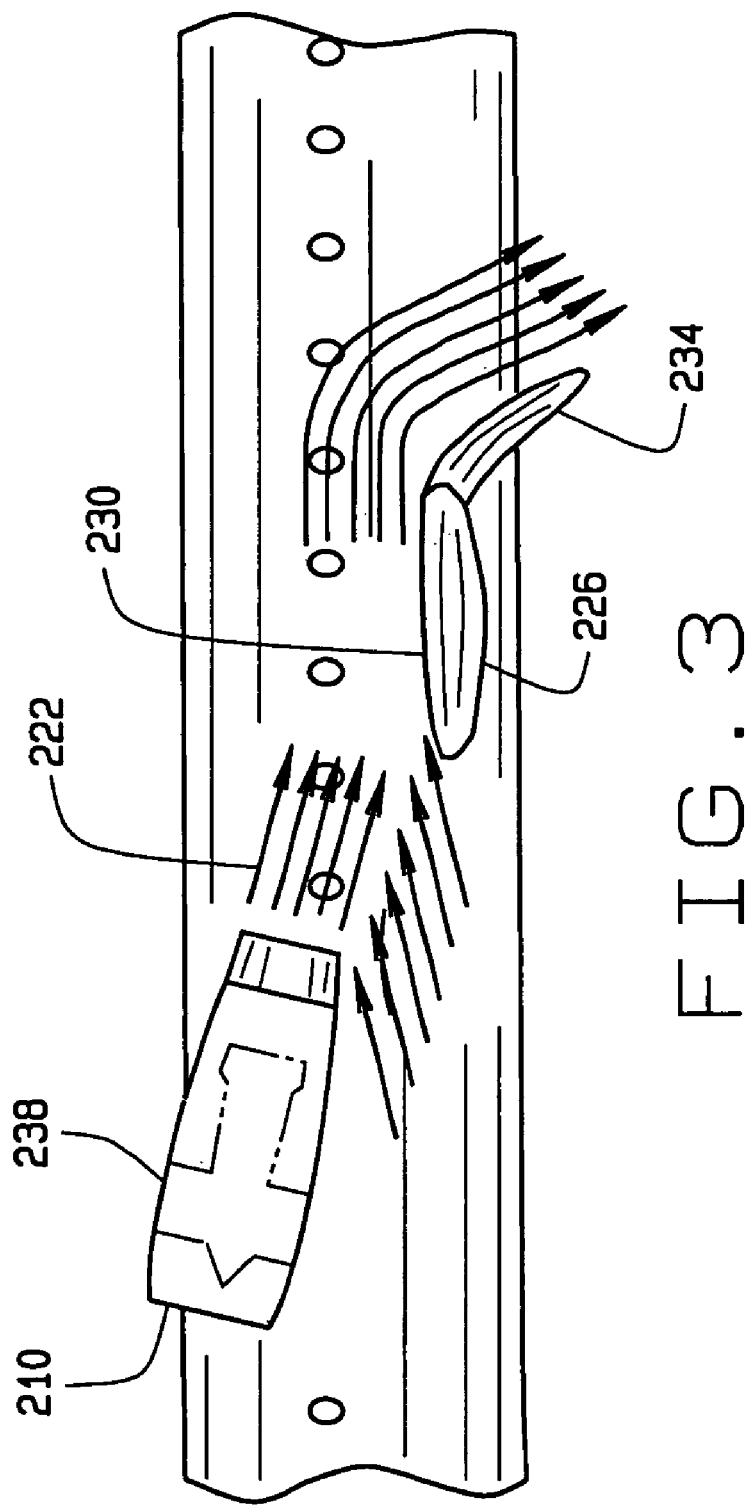
FIG. 3 is a schematic view of a rotatable engine shown in a preferred high-lift configuration in which the engine is rotated to discharge the exhaust flow across an upper surface of the airfoil and deployed trailing edge flap to provide upper surface blowing for augmenting lift according to a preferred embodiment of the invention.

The following description of the preferred embodiment(s) is merely exemplary in nature and is in no way intended to limit the invention, its application, or uses.

According to one aspect of the invention, thrust vectoring is used to switchably provide upper surface blowing (USB). By controllably changing the thrust vector of an exhaust flow generated by an engine, upper surface blowing can be "switched" on or off depending on the particular operating phase of the aircraft. For example, the exhaust flow can be vectored (FIGS. 1 and 3) to provide upper surface blowing to augment wing lift when relatively high lift is required, such as during short takeoff and landing (STOL) operations. During cruise, however, the exhaust flow can be discharged so that it does not provide upper surface blowing (i.e., USB switched off) (FIG. 2). In which case, the aircraft's cruise performance is unaffected by exhaust flow "scrubbing" the upper wing surface and drag produced there from. Indeed, various embodiments include an aircraft which in level cruising flight is as "clean" as an aircraft that does not have a USB system.

FIGS. 1 and 2 illustrate an exemplary jet engine 110 having a thrust vectoring nozzle 114. The thrust vectoring nozzle 114 defines an exhaust outlet 118. During operation, the engine 110 generates an exhaust flow which is delivered through the nozzle 114 to the exhaust outlet 118. Thrust is then generated as the exhaust flow 122 is discharged through the outlet 118 defined by the nozzle 114.

As shown, the engine is positioned such that the outlet 118 is disposed generally above and ahead of an airfoil 126. The airfoil 126 includes an upper surface 130 and a trailing edge flap 134. In FIG. 1, the flap 134 is shown in a deployed position suitable for landing and/or take-off conditions. FIG. 2 illustrates the flap 134 in a stowed position, which is typically associated with cruise conditions.

The thrust vectoring nozzle 114 is controllably movable to a corresponding one of a plurality of configurations. FIG. 1 illustrates the nozzle 114 in a first configuration 138 which is preferred for high-lift operations, such as during STOL operations in which high lift is needed.

In the first configuration 138, the nozzle 114 is positioned to direct the exhaust flow 122 generally downwardly and rearwardly across the upper airfoil surface 130. This upper surface blowing augments the lift produced by the airfoil 126.

As represented by arrows 142, the exhaust flow 122 adheres to the upper flap surface 146 by the Coanda effect and is turned in a downward and rearward direction following the upper flap surface 146. Aerodynamic lift is augmented because the thrust vector acting on the aircraft or other mobile platform has both an upward and forward component. Also, super-circulation (i.e., the aerodynamic lift increasing effect of distortion of airflow over the airfoil caused by an exhaust stream exiting downwardly and rearwardly from the flap trailing edge 150) also supplements conventional aerodynamic lift.

FIG. 2 illustrates the nozzle 114 in a second configuration 154 which is preferred for cruise. In the second configuration 154, the nozzle 114 is faired to discharge the exhaust flow 122 generally downstream or rearwardly in a longitudinal direction relative to the engine 110 to provide forward thrust.

Additionally, the engine 110 is disposed sufficiently above and ahead of the airfoil 126 such that the exhaust flow 122 does not contact or "scrub" the upper airfoil surface 130 when the nozzle 114 is in the second configuration 154. Accordingly, moving the nozzle 114 from the first configuration 138 (FIG. 1) to the second configuration 154 (FIG. 2) disables the upper surface blowing, in which case performance is unaffected by surface scrubbing of the exhaust flow across the upper airfoil surface 130. Conversely, moving the nozzle 114 from the second configuration 154 (FIG. 2) to the first configuration 138 (FIG. 1) turns on the upper surface blowing.

A wide range of thrust vectoring nozzles can be used in various embodiments of the invention. Accordingly, the specific references to thrust vectoring nozzle herein should not be construed as limiting the scope of the invention to only one specific form/type of thrust vectoring nozzle. For example, embodiments of the invention can be implemented using either single axis vectoring nozzles or two axis vectoring nozzles. Or, for example, various actuation systems and methods can be used for controllably moving the thrust vectoring nozzle including hydraulic actuation systems, yoke plates, electric actuation systems, pneumatic actuation systems, and/or other actuation means.

FIG. 3 illustrates another exemplary embodiment which includes an engine 210 disposed generally forward and above the airfoil 226 and its trailing edge flap 234. The engine 210 is rotatably supported to supporting structure. The engine 210 can be controllably rotated relative to the airfoil 226 into a corresponding one of a plurality of configurations to change a thrust vector of the exhaust flow 222 generated by the engine 210.

In FIG. 3, the engine 210 is shown rotated into a first configuration 238, which is preferred for high-lift operations. In the first configuration 238, the engine 210 is rotated to discharge the exhaust flow 222 across the upper airfoil surface 230. This upper surface blowing augments the lift produced by the airfoil and flap.

The engine 210 can also be rotated to a second configuration, which is preferred for cruise. In the second configuration, the exhaust flow 222 is discharged from the engine 210 generally downstream or rearwardly to provide forward thrust. Because the engine 210 is disposed sufficiently above and ahead of the airfoil 226, the exhaust flow 222 does not contact or "scrub" the upper airfoil surface 230 when the engine 210 is in the second configuration. Accordingly, moving the engine 210 from the first configuration 238 (FIG. 3) to the second configuration switches off upper surface blowing, in which case performance is unaffected by surface scrubbing of the exhaust flow across the upper airfoil surface 230.

A wide range of suitable jet engines, mounting arrangements, and actuation systems can be used in various embodiments of the invention. For example, various embodiments include rotatably mounting the jet engine to a pylon, which, in turn, is rigidly attached to an aircraft fuselage.

FIGS. 4 through 8 illustrate an exemplary aircraft 300 embodying at least one aspect of the invention. As shown, the aircraft 300 includes forward swept wings 326, a T-tail empennage 358, and engines 310 with thrust vectoring capabilities for switchably providing upper surface blowing which can be switched on or off.

By way of example, the engines 310 can include thrust vectoring nozzles as described above and shown in FIGS. 1 and 2. Alternatively, the engines 310 can be controllably rotatable relative to the wings 326 as described above and shown in FIG. 3. In either case, thrust vectoring of exhaust flows allows upper surface to be switched on or off depending on the particular operating phase of the aircraft.

Figure 4:
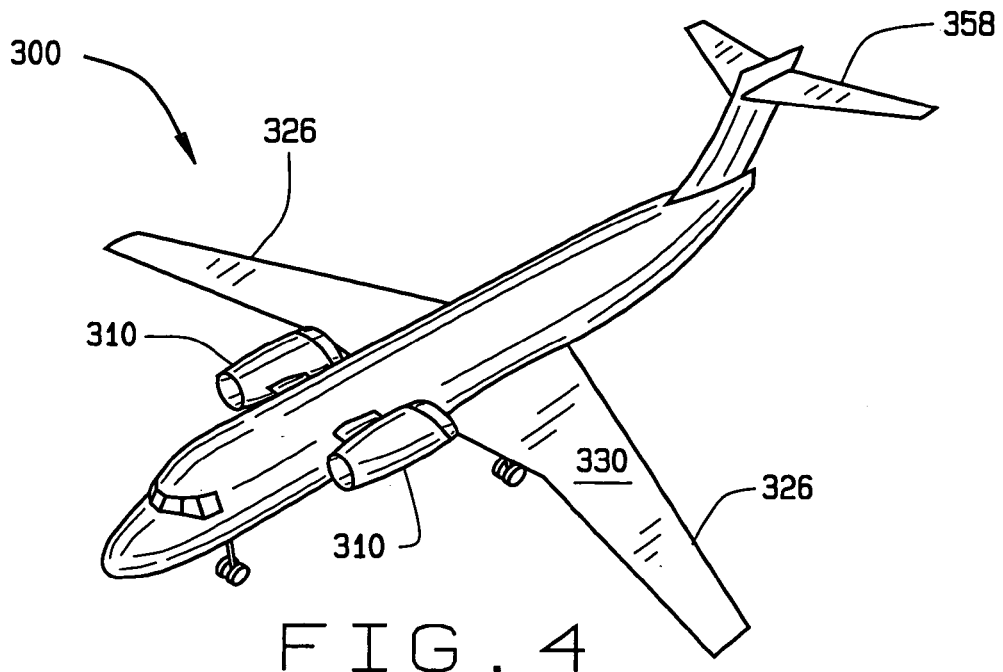
FIG. 4 is a front perspective view of an aircraft including forward swept wings, a T-tail empennage, and engines with thrust vectoring capabilities for switchably providing upper surface blowing according to a preferred embodiment of the invention.
Figure 5:
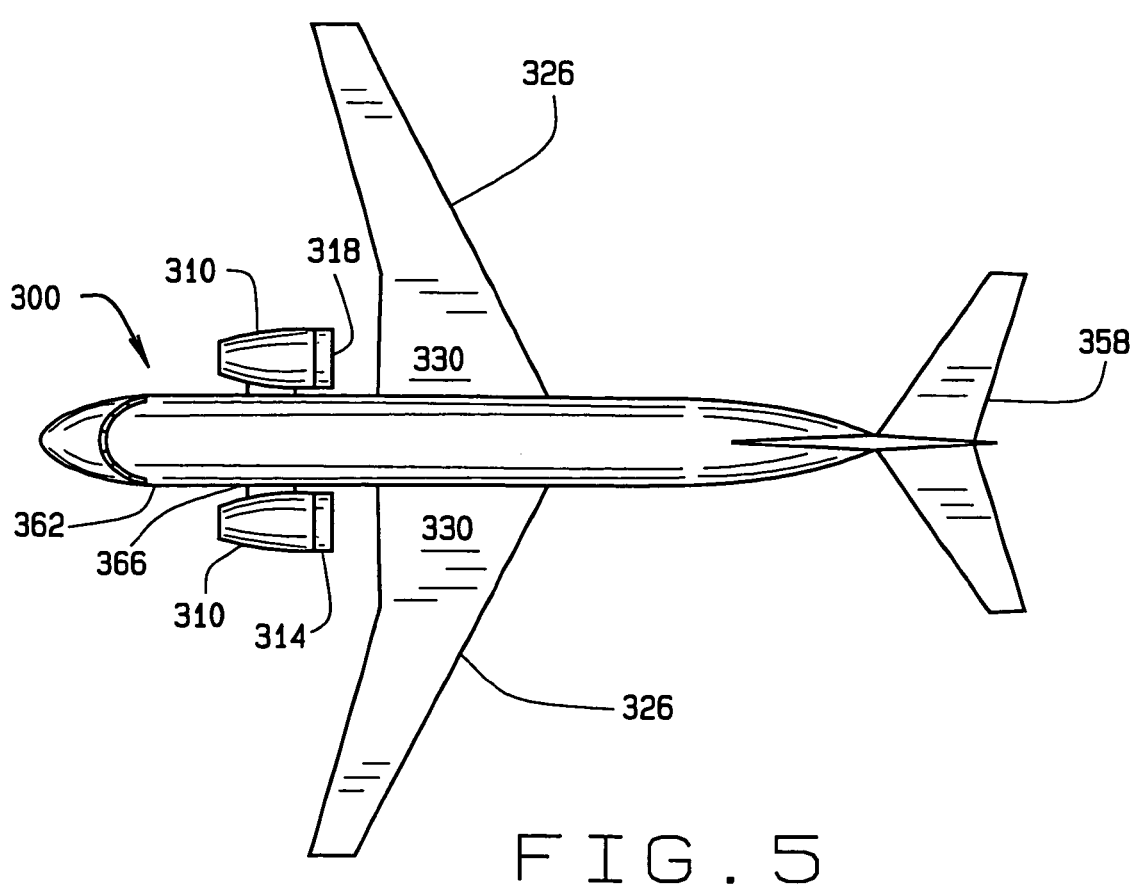
FIG. 5 is an upper plan view of the aircraft shown in FIG. 4.
Figure 6:
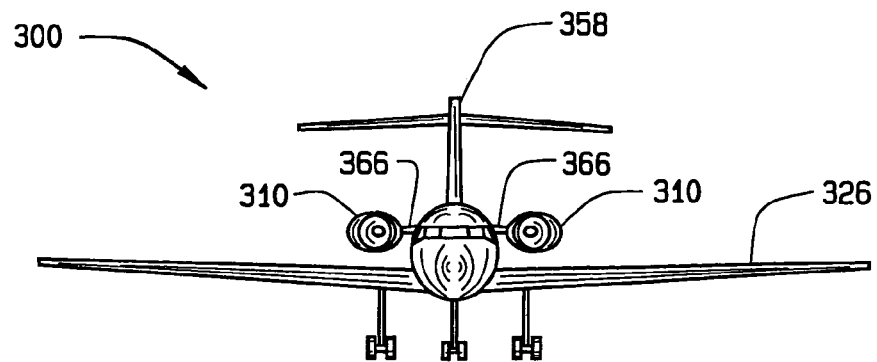
FIG. 6 is a front elevation view of the aircraft shown in FIG. 4.
Figure 7:
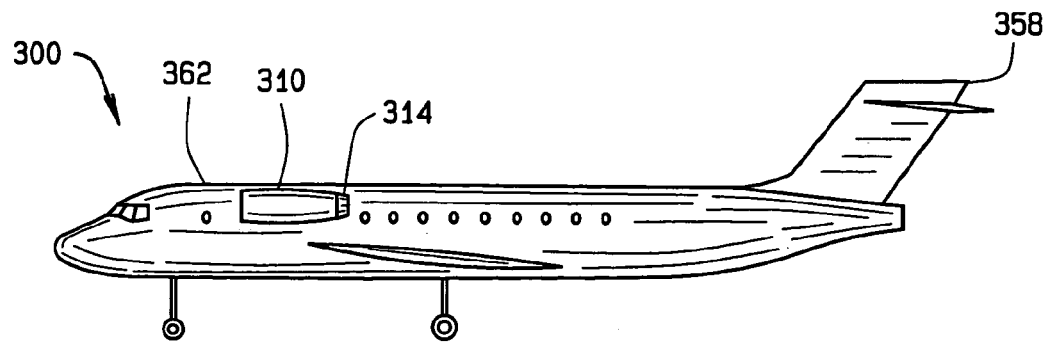
FIG. 7 is a side elevation view of the aircraft shown in FIG. 4.

As shown in FIGS. 4 through 6, the engines 310 are mounted to the fuselage 362 with pylons 366. The engines 310 are disposed above and ahead of the wings 326. Positioning the engines 310 forward of the wings 326 allows more ready access to the engines 310. The forward-mounting also allows the wing leading edges to be unobstructed by the engines 310 during cruise, and the wings 326 will also not experience interference drag at the pylon and nacelle, which will improve aerodynamic performance of the wings 326. This aerodynamic improvement allows smaller and lighter wings to be used than would the case if the wings were subject to interference drag from pylons and nacelles of wing-mounted engines.

Positioning the engines 310 forward of the wings 326 also allows for more forward positioning of the wings 326. This, in turn, increases the tail arm and allows the lift to go through the center of gravity of the aircraft, both of which allow for reductions in the tail size, weight, and wetted area.

The engine nozzles 314 and/or outlets 318 defined thereby are preferably shaped such that the exhaust flow laterally diffuses or spreads out horizontally after discharge from the outlets 318. Accordingly, the exhaust flow preferably becomes generally fan shaped and forms a more planar flow above the wings 326, which helps reduce scrubbing of the exhaust flow across the upper wing surfaces 330. Additionally, the lateral diffusing of the exhaust flow also reduces jet engine noise.

Figure 8:
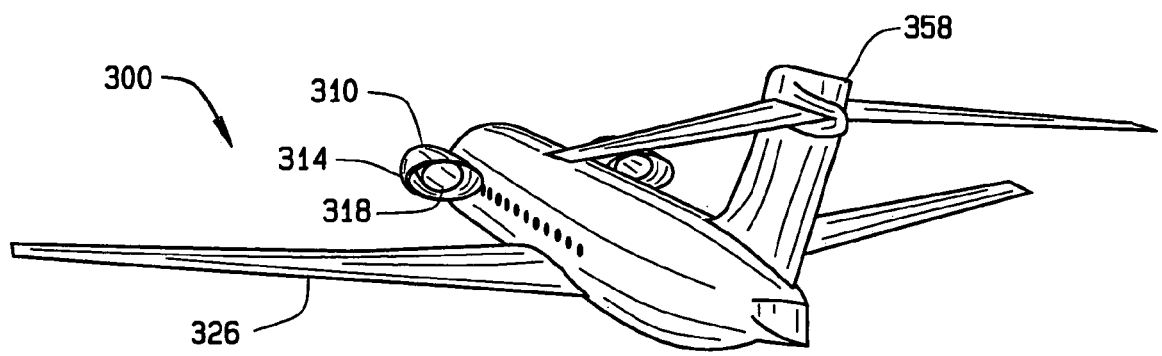
FIG. 8 is a rear perspective view of the aircraft shown in FIG. 4.

In FIG. 8, the engine nozzles 314 and outlets 318 include a generally oval shaped cross-section. Alternatively, other suitable cross-sectional shapes (e.g., generally rectangular, circular, etc.) can be employed for the nozzles and outlets depending at least in part on the particular application.

Figure 9:
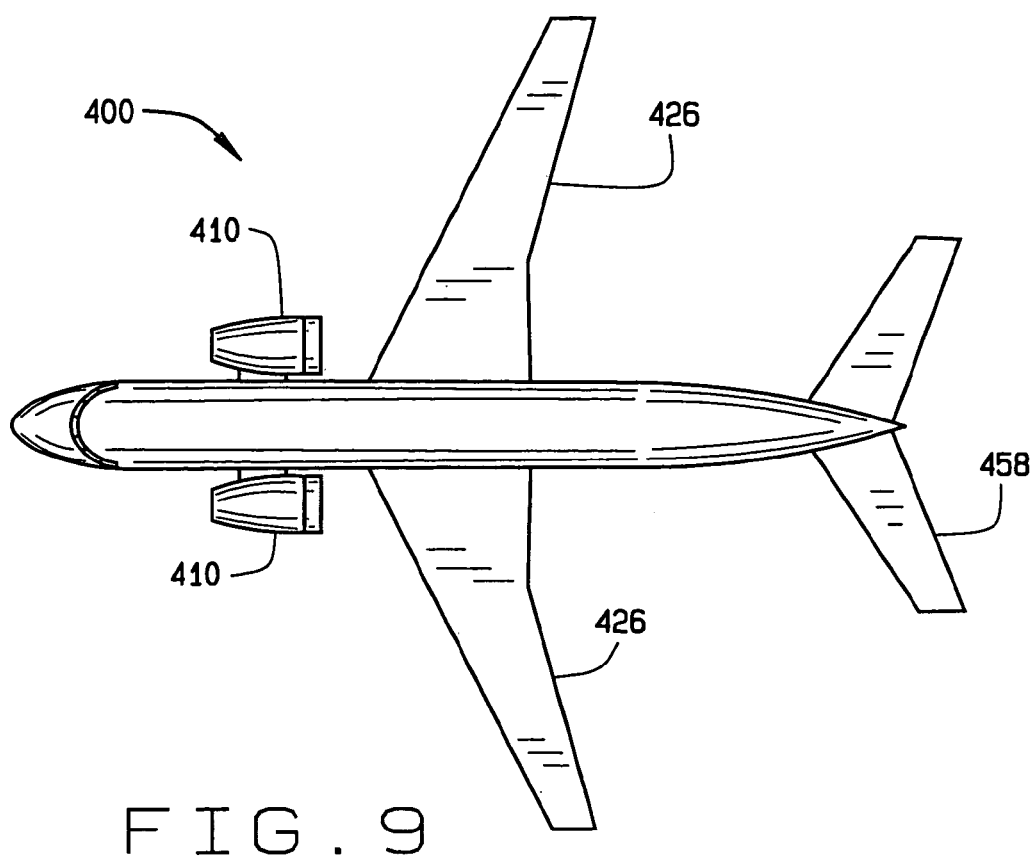
FIG. 9 is an upper plan view of an aircraft including rearward swept wings, a V-tail empennage, and engines with thrust vectoring capabilities for switchably providing upper surface blowing according to a preferred embodiment of the invention.
Figure 10:
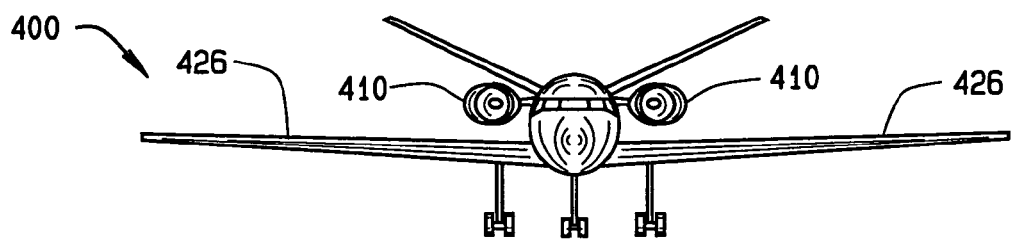
FIG. 10 is a front elevation view of the aircraft shown in FIG. 9.
Figure 11:
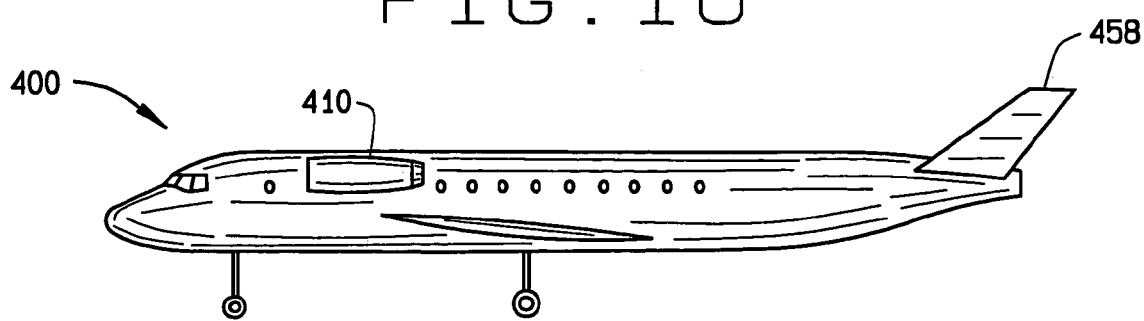
FIG. 11 is a side elevation view of the aircraft shown in FIG. 9.

FIGS. 9 through 11 illustrate another exemplary aircraft 400 embodying at least one aspect of the invention. As shown, the aircraft 400 includes rearward swept wings 426 and a V-tail empennage 458. The aircraft 400 also includes engines 410 positioned above and ahead of the wings 326.

The engines 410 include thrust vectoring capabilities for switchably providing upper surface blowing. By way of example, the engines 410 can include thrust vectoring nozzles as described above and shown in FIGS. 1 and 2. Alternatively, or additionally, the engines 310 can be controllably rotatable relative to the wings as described above and shown in FIG. 3. In either case, the exhaust flow can be vectored to switch on upper surface blowing, or switch off upper surface blowing.

Various embodiments can also include noise diffusers built into the thrust vectoring system to alleviate interior cabin noise from the forward-mounted engines. Noise can also be alleviated by lateral diffusion or horizontal spreading out of the exhaust flow after its discharge, for example, from a nozzle and/or outlet having a generally oval or rectangular cross-section.

With the engine location above the wings, the wings can at least partially shield engine noise from being transmitted in a downward direction. This noise attenuation can be especially useful while the aircraft is operating within the local airspace of an airport to reduce noise to communities neighboring the airport. This reduction and redirection of engine noise allows for increased flexibility in managing the environmental impacts of departing and arriving aircraft.

Accordingly, embodiments of the invention allow aircraft to utilize upper surface blowing during STOL or other high lift operations without having to incur the performance penalties or losses typically associated with upper surface blowing during cruise. The STOL capabilities enabled by embodiments of the invention can allow for reductions in runway congestion at major hubs and other airports, as well as allowing access to shorter fields and runways, e.g., point-to-point operations. Further, allowing upper surface blowing to be "switched off" eliminates, or least reduces, surface scrubbing of the jet exhaust across the upper wing surfaces, which, in turn, increases propulsive efficiency.

The invention is applicable to a wide range of lift-producing surfaces and airfoils (e.g., but not limited to, multi-element airfoils, fixed wings, variable geometry wings, rotary wings, right semi-span wings, left semi-span wings, full-span wings, straight wings, forward swept wings, backward swept wings, slotted wings, delta wings, horizontal tails, tapered wings, untapered wings, slanted wings, automobile spoilers and airfoils, among others). Accordingly, the specific references to airfoil and wing herein should not be construed as limiting the scope of the invention to only one specific form/type of lift-producing surface.

The invention is also applicable to a wide range of jet engines (e.g., but not limited to gas turbine engines, turbofan engines, turbojet engines, etc.) Accordingly, the specific references to jet engine herein should not be construed as limiting the scope of the present invention to only one specific form/type of engine.

The invention is also applicable to a wide range of mobile platforms (e.g., but not limited to, short takeoff and landing (STOL) aircraft, military transport aircraft, fighter jets, private jets, commercial aircraft, automobiles, among others). Accordingly, the specific references to aircraft herein should not be construed as limiting the scope of the present invention to only one specific form/type of mobile platform.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A method of operating a jet engine on a mobile platform having at least one lift-producing surface, the method comprising:

using the engine to generate an exhaust flow;

controllably moving at least a nozzle of the engine into a corresponding one of a plurality of configurations including at least:

a first configuration in which the exhaust flow is directed to flow across an upper surface of the lift-producing surface to provide upper surface blowing;

a second configuration in which the exhaust flow is discharged to flow generally downstream; and the engine being disposed sufficiently above and ahead of the lift-producing surface such that the exhaust flow does not provide upper surface blowing and, thereby, aerodynamic performance of the lift-producing surface is unaffected by upper surface blowing when the second configuration is used.

2. The method of claim 1, wherein:
the nozzle comprises a thrust vectoring nozzle; and
controllably moving at least the nozzle of the engine comprises controllably moving the thrust vectoring nozzle.

3. The method of claim 2, wherein the thrust vectoring nozzle is faired when the second configuration is used.

4. The method of claim 1, wherein controllably moving at least the nozzle of the engine comprises controllably rotating the engine relative to the lift-producing surface.

5. The method of claim 1, wherein:
the mobile platform comprises an aircraft; and
the lift-producing surface comprises a wing.

6. The method of claim 5, further comprising:
using the first configuration during a high-lift phase of operation of the aircraft; and
using the second configuration during a cruising phase of operation of the aircraft.

7. The method of claim 5, wherein the engine is sufficiently above and ahead of the wing such that the exhaust flow does not contact an upper surface of the wing when the second configuration is used.

8. The method of claim 5, wherein the engine is disposed sufficiently above and ahead of the wing so that performance of the aircraft is unaffected by surface scrubbing of the exhaust flow across an upper surface of the wing when the second configuration is used.

9. The method of claim 1, further comprising causing the exhaust flow to laterally diffuse.

10. An aircraft, comprising:
a wing having an upper surface;
a jet engine including a thrust vectoring nozzle;
the nozzle being controllably movable into a corresponding one of a plurality of configurations including at least:
a first configuration in which the nozzle is positioned to direct an exhaust flow across the upper wing surface to provide upper surface blowing to augment lift;
a second configuration in which the nozzle is positioned to discharge the exhaust flow generally downstream; and
the engine being disposed sufficiently above and ahead of the wing such that the exhaust flow does not provide upper surface blowing and, thereby, aerodynamic performance of the wing is unaffected by upper surface blowing when the nozzle is in the second configuration.

11. The aircraft of claim 10, wherein the nozzle is faired in the second configuration.

12. The aircraft of claim 10, wherein the nozzle is adapted to cause lateral diffusion of the exhaust flow.

13. The aircraft of claim 12, wherein the nozzle includes a generally oval shaped cross-section.

14. The aircraft of claim 10, wherein the engine is disposed sufficiently above and ahead of the wing such that the exhaust flow does not contact the upper wing surface when the nozzle is in the second configuration.

15. The aircraft of claim 10, wherein the engine is disposed sufficiently above and ahead of the wing so that aircraft performance is unaffected by surface scrubbing of the exhaust flow across the upper wing surface when the nozzle is in the second configuration.

16. An aircraft, comprising:
a wing having an upper surface;
a jet engine rotatably supported to supporting structure of the aircraft;
the engine being controllably rotatable relative to the wing into a corresponding one of a plurality of configurations including at least:
a first configuration in which the engine is rotated to discharge the exhaust flow across the upper wing surface to provide upper surface blowing to augment lift;
a second configuration in which the engine is rotated to discharge the exhaust flow generally downstream; and
the engine being disposed sufficiently above and ahead of the wing such that the exhaust flow does not provide upper surface blowing and, thereby, aerodynamic performance of the wing is unaffected by upper surface blowing when the engine is in the second configuration.

17. The aircraft of claim 16, wherein the engine is faired in the second configuration.

18. The aircraft of claim 16, wherein the engine includes a nozzle adapted to cause lateral diffusion of the exhaust flow.

19. The aircraft of claim 18, wherein the nozzle includes a generally oval shaped cross-section.

20. The aircraft of claim 16, wherein the engine is disposed sufficiently above and ahead of the wing such that the exhaust flow does not contact the upper wing surface when the engine is in the second configuration.

21. The aircraft of claim 16, wherein the engine is disposed sufficiently above and ahead of the wing so that performance of the aircraft is unaffected by surface scrubbing of the exhaust flow across the upper wing surface when the engine is in the second configuration.

22. A method of operating a jet engine on a mobile platform having at least one airfoil, the method comprising:
using the engine to generate an exhaust flow;
controllably vectoring the exhaust flow depending on a phase of operation of the mobile platform, the controllably vectoring including:
vectoring the exhaust flow to flow across a surface of the airfoil to provide surface blowing to augment aerodynamic force generated by the airfoil during a first phase of operation of the mobile platform;
vectoring the exhaust flow to flow generally downstream during a second phase of operation of the mobile platform; and
the engine being positioned sufficiently above and ahead of the airfoil such that the exhaust flow does not provide surface blowing and, thereby, aerodynamic performance of the airfoil is unaffected by surface blowing when the exhaust flow is vectored to flow generally downstream.

23. The method of claim 22, wherein the controllably vectoring comprises controllably moving a thrust vectoring nozzle of the engine.

24. The method of claim 22, wherein the controllably vectoring comprises controllably rotating the engine relative to the airfoil.

25. The method of claim 22, further comprising causing the exhaust flow to laterally diffuse.

26. The method of claim 22, wherein the mobile platform comprises an aircraft, and the aerodynamic force comprises lift.

* * * * *